United States Patent [19]
Pedigo

[11] 3,846,963
[45] Nov. 12, 1974

[54] GRASS CLIPPING COMPACTER ATTACHMENT FOR LAWNMOWERS

[76] Inventor: Richard A. Pedigo, 2900 Fairfax St., Denver, Colo. 80207

[22] Filed: Oct. 4, 1972

[21] Appl. No.: 294,815

[52] U.S. Cl. ............................... 56/13.3, 56/DIG. 8
[51] Int. Cl. ............................................ A01d 73/00
[58] Field of Search .................. 56/1 R, 12.8–13.4, 56/16.7, 16.9, 16.4–16.6, 500–505, 202, DIG. 8; 15/328, 339; 241/186 A, 186.4

[56] References Cited
UNITED STATES PATENTS
3,058,284   10/1962   Anderson............................ 56/13.3

Primary Examiner—Louis G. Mancene
Assistant Examiner—J. A. Oliff
Attorney, Agent, or Firm—Richard D. Law

[57] ABSTRACT

A power-driven, spiral-flight auger in a tubular housing, attached to a lawnmower, with a double flight at its discharge end compacts grass clippings from the lawnmower into a substantially smaller mass.

4 Claims, 11 Drawing Figures

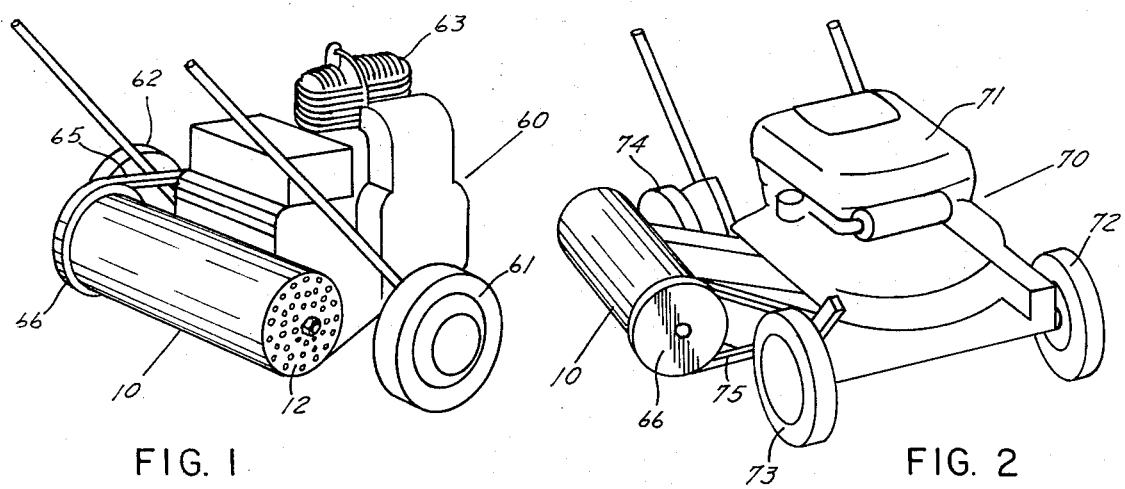
FIG. 1
FIG. 2
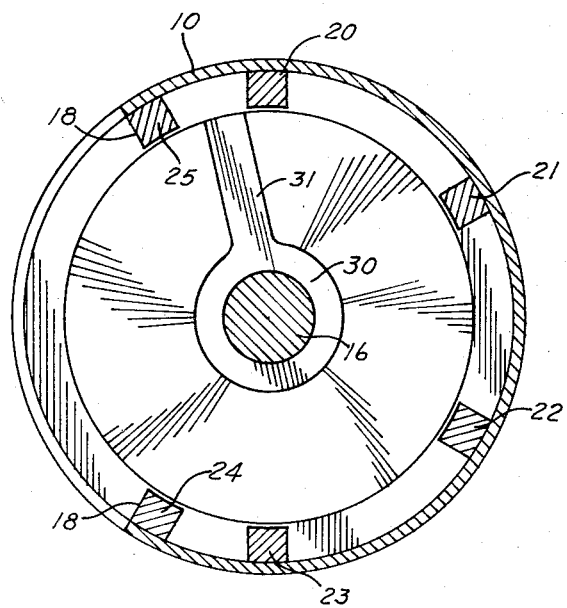
FIG. 4
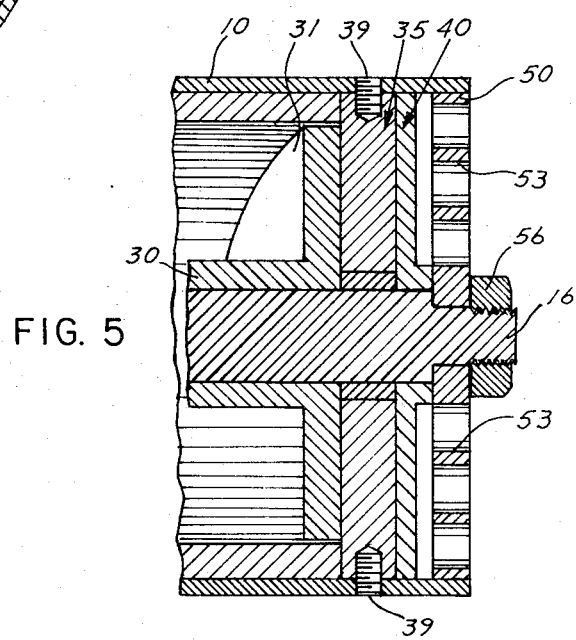
FIG. 5

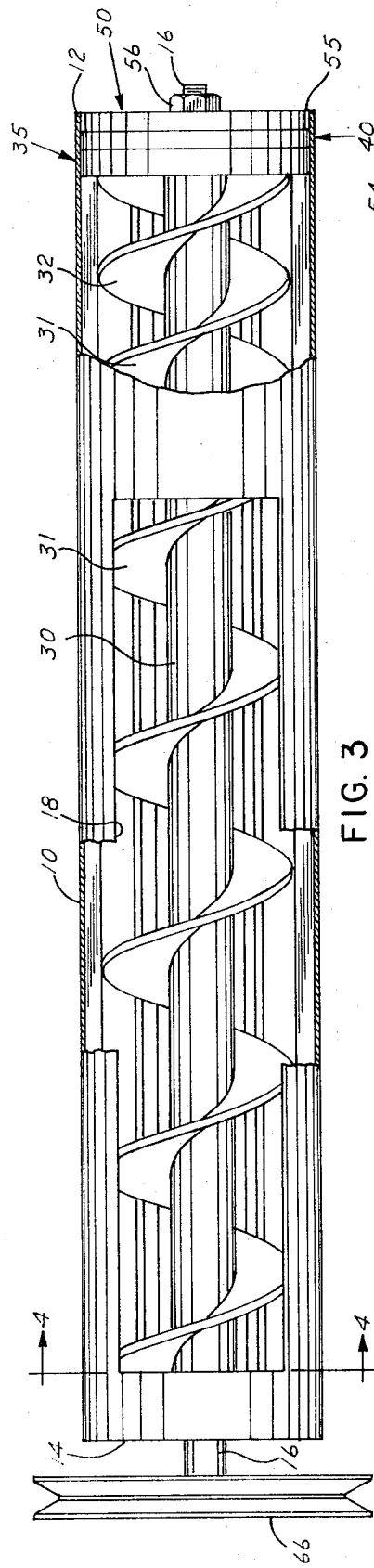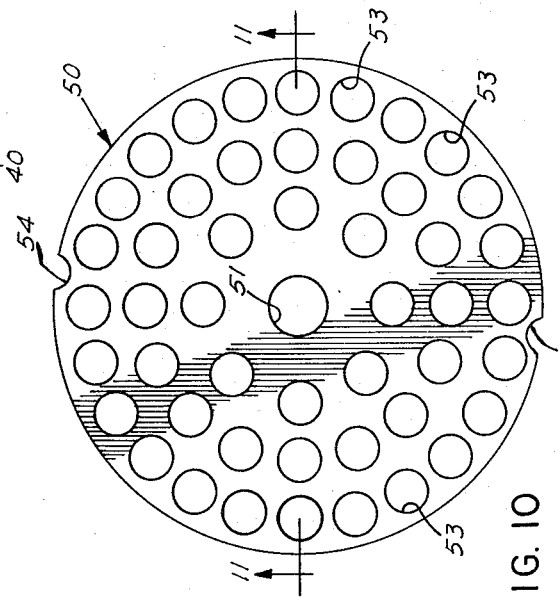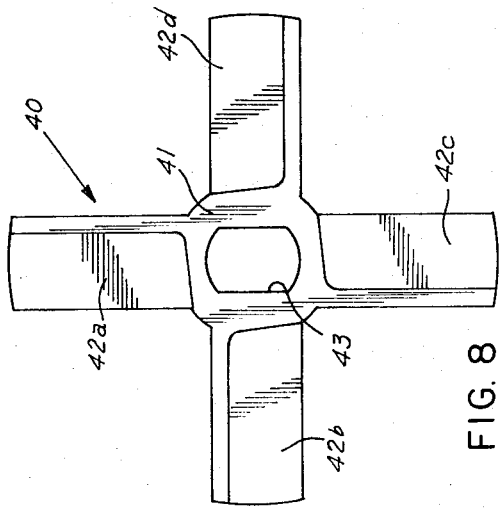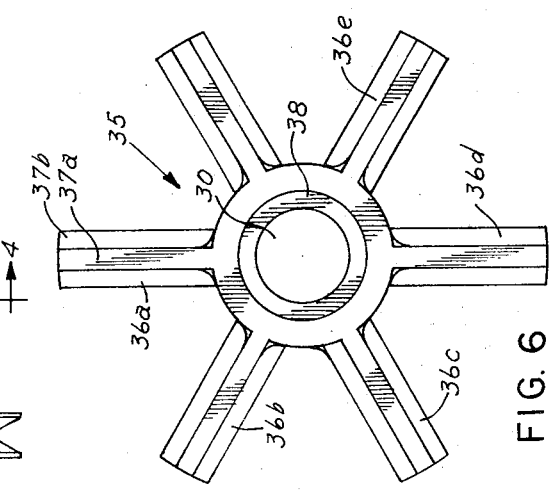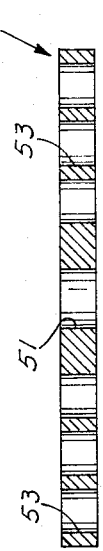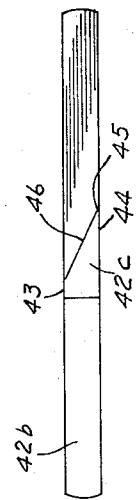

GRASS CLIPPING COMPACTER ATTACHMENT FOR LAWNMOWERS

Most lawnmowers are arranged with means for collection of grass clippings during cutting. The recovered loose clippings are bulky and unwieldly for disposal. Numerous containers are necessary to hold the fresh-cut clippings for subsequent pickup and disposal. The weight of the recovered clippings is not excessive, but the bulk or volume causes initial storage problems. Also, grass catchers, which are arranged to be attached to a lawnmower, seem to be unwieldly for most amateur gardeners in relation to the containers for storage, causing many spilled clippings in the attempts to place the clippings from the catcher into a suitable container.

In my earlier U.S. Pat., No. 3,664,097, issued May 23, 1972, for PELLETIZER FOR LAWNMOWER, I have described a device providing a generally conical housing, having an axial shaft. Mounted on the shaft are a series of propeller blades arranged in a larger portion of the housing. Rotation of the shaft rotates the fans for propelling grass clippings in to a spiral flight conveyor for compressing the clippings through an extrusion plate. I have now discovered that a right cylindrical housing of uniform diameter with a spiral flight extending therethrough and having a double spiral at the discharge end effectively compresses the grass clippings for extrusion out of the container. This arrangement provides a substantial improvement over my earlier invention.

Included among the objects and advantages of the present invention is to provide an improved attachment for lawn mowers for compressing mower generated grass clippings.

Another object of the invention is to provide a power driven attachment for power lawnmowers for reducing the bulk of mower generated grass clippings.

Still another object of the invention is to provide a simplified attachment for a power lawnmower for pelletizing clippings generated by the power lawnmower.

Yet another object of the invention is to provide a power driven spiral flight auger arrangement for mowing and compressing grass clippings and discharging them as a dense extruded pellet.

An additional object of the invention is to provide a power driven grass clippings compressor easily attached to both rotary and reel type lawnmowers.

These and other objects and advantages of the invention may be readily ascertained by referring to the following description and appended illustrations in which:

FIG. 1 is a generally perspective schematic view of a reel type mower having a grass clipping compressor device according to the present invention attached thereto;

FIG. 2 is a generally perspective, schematic view of a rotary type lawnmower having a grass clipping compressor according to the invention attached thereto;

FIG. 3 is a side elevational view, partly cut away, of a grass clipping compressing attachment according to the invention;

FIG. 4 is a cross sectional enlarged detail view of the device of FIG. 3 taken along section line 4—4;

FIG. 5 is a cross sectional, enlarged detail of the discharge end of the device of FIG. 3;

FIG. 6 is a plan view of the stationary cutter mounted at the discharge end of the device of FIG. 3;

FIG. 7 is a side elevational view of the device of FIG. 6;

FIG. 8 is a plan view of a rotary cutter arranged to be mounted on a rotating shaft of the device of FIG. 3;

FIG. 9 is a side elevational view of the cutter of FIG. 8;

FIG. 10 is a plan view of an extruder plate for the device of FIG. 3; and

FIG. 11 is a cross sectional elevational view of the device of FIG. 10 taken along sectional lines 11—11 of FIG. 10.

In the device selected for illustration in FIGS. 3 through 11, a right cylindrical housing 10 is provided with an open discharge end 12 and a generally closed end 14. The end 14 includes a central aperture for passing a shaft 16 therethrough. The cylindrical container is provided with a side opening 18 adjacent to closed end 14 for the admission of grass clippings from a power lawnmower. Mounted longitudinally inside the cylindrical housing 10 are a series of spaced ribs 20, 21, 22 and 23. The edges of the opening 18 are turned back to provide additional ribs 24 and 25 at the mouth of the opening 18.

Mounted internally of the cylindrical housing 10 is a spiral flight conveyor 30 which is secured to the shaft 16 (or is integral therewith) and the shaft 16 is arranged to rotate the spiral flight 30 by means of a pulley 66 attached to the outside end of the shaft. In the section of the spiral flight 30 from the end adjacent the closed end 14 to the opposite end of the opening 18, a single flight 31 is provided along the central shaft. Beyond the opening 18 a second spiral flight 32 is added to provide additional impetus for moving and compressing grass clippings from the opening 18 through the discharge end.

At the discharge end 12 of the housing 10, a stationary cutter 35 is mounted internally of the housing, and this includes radial blades 36a through 36f, the blades being identical blades. A bearing set 38 is mounted in the stationary cutter 35 to permit easy rotation of the shaft of the auger passing through the stationary blade. Each blade of the stationary set is bevelled from front (up stream) to rear providing a narrow face 37a facing the opening 18 of the spiral shaft housing and an enlarged base 37b having sharp edges. This provides a larger opening going to a smaller opening as the grass clippings pass the stationary blade. To prevent rotation of the stationary cutter, set screws 39 may be used to secure it in position in the housing.

Mounted internally of the housing on the shaft 16 and for conjoint rotation therewith is a rotary cutter 40 which includes a hub 41 and four blades 42a through 42d extending outwardly therefrom. The hub 41 includes a shaped hole 43 (a double side flattened circle) for mounting on a shaft 16 which is flattened along its sides to permit the shaped hole to pass thereon providing concurrent rotation of the rotary cutter with the shaft. Each blade 42 on the cutter includes a downstream face 43 and an upstream face 44 which is arranged to rotate adjacent the downstream face 37b of the stationary blades. Each blade also includes a cutting edge 45 which rotates against the downstream edge 37b of the blades of the stationary set, providing cutting edges moving past each other.

Closing the outer end of the discharge end is an extrusion plate 50, which includes a central shaft opening 53 to permit rotation of a shaft 16 therethrough. The extrusion plate includes a plurality of small openings 53 for passing compressed grass clippings as pellets. To prevent the plate from rotating set screws (not shown) may be passed through the housing 10, or a pair of opposed indents 54 and 55 on the plate may be arranged to seat on small ribs (not shown) in the interior housing wall, which is a conventional expedient to prevent rotation of circular parts.

The exterior of the invention may be mounted on either a rotary or a reel type lawnmower, and as shown in FIG. 1 a reel type lawnmower, shown in general as numeral 60, provided with wheels 61 and 62 is arranged with an engine 63. The housing 10 is attached across the outlet of the reel type mower and a belt drive 65 mounted on an engine driven pulley, not shown, mounts over pulley 66 on the shaft 16. The pulley arrangement should be set to provide a rotation of the spiral flight conveyor from about 250 to 600 rpm. Where desired a bag may be placed over the discharge end 12 to gather the pellets as they are extruded.

As shown in FIG. 2 a rotary type lawnmower, shown in general by numeral 70, includes an engine 71, wheels 72, 73, 74, etc., with the housing 10 mounted on the side of the mower. The pulley 66 is driven by a belt 75 from an engine driven pulley, not shown, to rotate the spiral flight in the pelletizer at the above indicated rpm.

In either case, whether the lawnmower is a rotary or reel type, the housing 10 is arranged at the outlet of the lawnmower to collect the grass clippings as the lawnmower passes over the lawn. The spiral flight is rotated which forces grass clippings coming into the opening 18 into the double flight at the discharge end, past the stationary cutters, through the rotary cutters and ultimately out through the extrusion plate. Using ⅜ inch holes in the extrusion plate the grass clippings are compressed at about an eight-to-one ratio. The openings in the extrusion plate may extend from about ¼ inch to about 11/16 inch, however ⅜ inch holes have been found to be preferred. The rotary cutter with its cutting face 46 arranged away from the stationary cutters may extend from an angle from about 20° to 45°; however, it has been found that a 25° to 30° angle provides very effective operation. The lower angles seem to produce more force for pushing the grass through the extrusion plate. It has, furthermore, been found that due to the action of the cutter blade and the vibration of the unit during operation, the resultant pellets are about ⅜ inch in length. Also, without the extrusion plate, the grass clippings are pulverized, and may not need gathering.

I claim:

1. A grass clipping compressor apparatus for use with a power lawnmower having a cutting device driven by a power means for severing lawn clippings, said compressor apparatus comprising:

a. a hollow, generally uniform diameter tubular body mounted on said lawnmower and having a generally closed end and an opposite full diameter open end, said body further having an elongated side opening positioned longitudinally along a portion of said body and near said closed end, said body side opening being arranged to receive said grass clippings from said mower;

b. a rotatable shaft means mounted in said tubular body with one end extending centrally through said body closed end;

c. a spiral conveyor means extending through said body and rotatably mounted on said shaft means, said conveyor means terminating adjacent said body open end and including at least a double flight portion adjacent said open end;

d. a stationary cutting means mounted in the open end of said body and arranged in contact with the end of said conveyor means, said stationary cutting means includes a plurality of radially extending blades and centrally located bearing means for supporting the end of said rotatable shaft means;

e. a rotary cutting means mounted for rotation on the end of said shaft means downstream of said stationary cutting means and including a plurality of radially extending blades in rotative contact with said stationary cutting means;

f. an extruder plate having a plurality of holes mounted in said body open end adjacent to and downstream of said rotary cutting means; and g. means for drivingly connecting the extended end of said shaft means with said lawnmower drive means whereby said apparatus compresses and forms said grass clippings into dense pellets having considerably less volume than the loose clippings.

2. A grass clipping compressor apparatus as defined in claim 1 wherein:

said radial blades of said stationary cutting means including a sloped surface having an angle to provide a cutting edge adjacent said rotary cutting means.

3. A grass clipping compressor apparatus as defined in claim 1 wherein:

said spiral conveyor means includes a single flight portion which corresponds to said body side opening.

4. A grass clipping compressor apparatus as defined in claim 1 wherein:

said tubular body includes a plurality of inwardly projecting longitudinal radial ribs arranged to extend along the length of the inner surface of said tubular body, and said spiral conveyor means has a diameter whereby the outer edge of said spiral conveyor means is in close proximity to said ribs.

* * * * *